United States Patent
Raza

(10) Patent No.: US 7,334,147 B1
(45) Date of Patent: *Feb. 19, 2008

(54) METHOD AND ARCHITECTURE FOR SYNCHRONIZING A PATH GENERATOR AND/OR EXTRACTOR TO A PROCESSOR

(75) Inventor: S. Babar Raza, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 934 days.

This patent is subject to a terminal disclaimer.

(21) Appl. No.: 10/254,103

(22) Filed: Sep. 24, 2002

Related U.S. Application Data

(63) Continuation of application No. 09/436,314, filed on Nov. 8, 1999, now Pat. No. 6,502,197.

(60) Provisional application No. 60/109,501, filed on Nov. 23, 1998.

(51) Int. Cl.
*H04L 7/00* (2006.01)
*H04J 3/06* (2006.01)

(52) U.S. Cl. .................. 713/400; 370/503; 370/520

(58) Field of Classification Search ............... 713/400; 370/509, 520, 503
See application file for complete search history.

(56) References Cited

U.S. PATENT DOCUMENTS

| 3,763,758 A | 10/1973 | Manack et al. ............ 95/89 R |
|---|---|---|
| 4,534,025 A | 8/1985 | Floyd ............................ 370/85 |
| 5,029,183 A | 7/1991 | Tymes ............................. 375/1 |
| 5,103,461 A | 4/1992 | Tymes ............................. 375/1 |
| 5,157,687 A | 10/1992 | Tymes ............................. 375/1 |
| 5,461,622 A | 10/1995 | Bleickardt et al. ............. 370/84 |
| 5,668,803 A | 9/1997 | Tymes et al. ................ 370/312 |
| 5,740,189 A | 4/1998 | Tiedje ........................... 371/53 |
| 6,061,365 A | 5/2000 | Yeung et al. ................. 370/470 |
| 6,263,443 B1 | 7/2001 | Anderson et al. ............ 713/201 |
| 6,298,038 B1 | 10/2001 | Martin et al. ................ 370/216 |
| 6,502,197 B1 * | 12/2002 | Raza ............................ 713/400 |

OTHER PUBLICATIONS

Practical Data Communications, by Roger L. Freeman, 1995, pp. 433-448.

Overhead Serial Communication Scheme, U.S. Serial No. 09/435,749, filed Nov. 8, 1999.

* cited by examiner

*Primary Examiner*—Thomas Lee
*Assistant Examiner*—Suresh K Suryawanshi
(74) *Attorney, Agent, or Firm*—Blakely, Sokoloff, Taylor & Zafman LLP

(57) ABSTRACT

An apparatus comprising a first circuit and a second circuit. The first circuit may be configured to synchronize at least one transport overhead byte with a pulse on an external pin. The second circuit may be configured to synchronize the transport overhead byte to the overhead processor. The overhead processor may be synchronized with (i) an overhead generator and (ii) an overhead extractor.

20 Claims, 4 Drawing Sheets

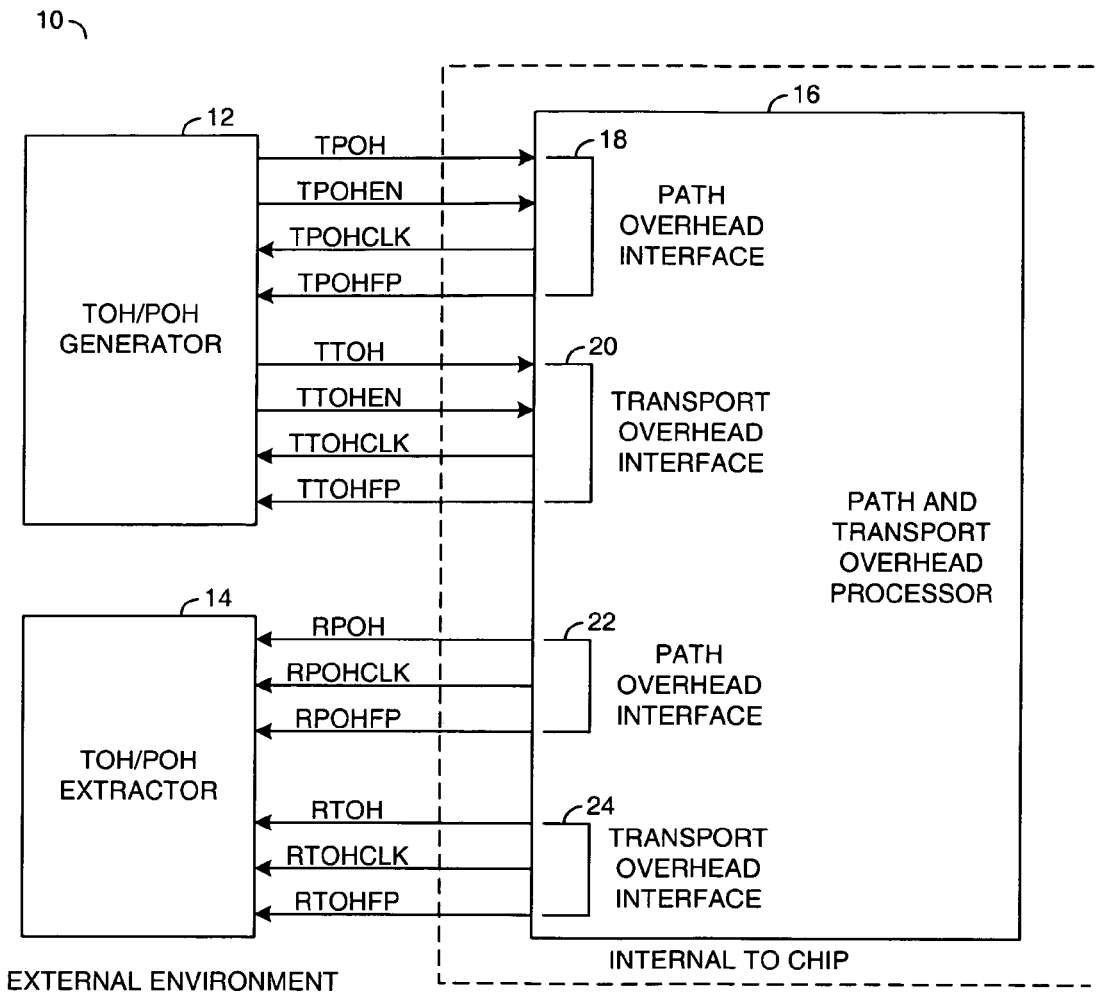
FIG. 1
(CONVENTIONAL)

METHOD AND ARCHITECTURE FOR SYNCHRONIZING A PATH GENERATOR AND/OR EXTRACTOR TO A PROCESSOR

This is a continuation of U.S. Ser. No. 09/436,314, filed Nov. 8, 1999, now U.S. Pat. No. 6,502,197, issued Dec. 31, 2002.

The present application claims the benefit of provisional application Ser. No. 60/109,501, filed Nov. 23, 1998 and is hereby incorporated by reference in its entirety.

CROSS-REFERENCE TO RELATED APPLICATIONS

The present application may be related to Ser. No. 09/435,749, filed Nov. 8, 1999, now U.S. Pat. No. 6,665,265, issued Dec. 16, 2003 and is hereby incorporated by reference in its entirety.

FIELD OF THE INVENTION

The present invention relates to synchronizing circuits generally and, more particularly, to an architecture and method for synchronizing a transport and path overhead generator and a transport and path overhead extractor to a transmit and path overhead processor.

BACKGROUND OF THE INVENTION

As shown in the block diagram of FIG. 1, a conventional circuit 10 comprises a transport overhead/path overhead generator 12, a transport overhead/path overhead extractor 14, and a path and transport overhead processor 16. The path and transport overhead processor 16 receives or generates a relatively large set of data communications signals. The path and transport overhead processor 16 comprises a path overhead interface 18, a transport overhead interface 20, a path overhead interface 22 and a transport overhead interface 24. The path overhead interface 18 comprises a number of signals TPOH, TPOHEN, TPOHCLK and TPOHFP, and receives or generates signals RPOH, RPOHCLK and RPOHFP. Transmit and receive path overhead pins (e.g., "TPOH" and "RPOH") are for respectively transmitting data to and receiving data from the path and transport overhead processor 16. The path overhead and transport processor 16 transmits and receives path overhead clocks (e.g., RPOHCLK and TPOHCLK), transport overhead clocks (e.g., TTOHCLK and RTOHCLK), transport overhead enable signals (e.g., XTOHEN), and start of the payload indicators (e.g., TPOHFP). The path overhead enable pin (e.g., TPOHEN) for the path overhead generator 12 indicates whether or not the current path overhead bytes should be used.

In this methodology, a separate interface is provided for transport overhead communication. For the transmit side, a transmit path frame signal TPOHFP is asserted by the path and transport overhead processor 16 to synchronize the generator 12 and the processor 16. Once the path overhead generator 12 detects an asserted signal on the TPOHFP pin, all the path overhead bytes serially shift out on the data pin TPOH. This serial shifting of the data is timed and/or controlled by a clock signal (e.g., TPOHCLK).

For the receive side, the path overhead processor 16 asserts a receive frame signal (e.g., RPOHFP) in order to indicate to the path overhead extractor 14 that the path overhead is ready and is being presented on the data pin (e.g., RPOH). Data extraction operations are timed and/or controlled by a clock (e.g., RPOHCLK).

A significant disadvantage of this conventional methodology is the relatively high pin count resulting from the separate transport overhead interfaces 20 and 24 and the path overhead interfaces 18 and 22. For multiple framer chips (e.g., having 2, 4 or more path overhead processors), separate interfaces will increase the pin count significantly. Another disadvantage of such a conventional approach is the need for two additional separate sets of shift registers for the receive side and two separate sets of shift registers for the transmit side.

SUMMARY OF THE INVENTION

The present invention concerns an apparatus comprising a first circuit and a second circuit. The first circuit may be configured to synchronize at least one transport overhead byte with a pulse on an external pin. The second circuit may be configured to synchronize the transport overhead byte to the overhead processor. The overhead processor may be synchronized with (i) an overhead generator and (ii) an overhead extractor.

Another aspect of the present invention concerns a method for synchronizing a path overhead generator or a path overhead extractor to a path overhead processor, comprising the steps of (A) synchronizing at least one transport overhead byte with a pulse on an external pin, (B) presenting the transport overhead byte to the overhead processor in a first row and (C) processing the transport overhead byte in a second row, where the second row follows the first row.

The objects, features and advantages of the present invention include (i) providing an architecture and method that may reduce the number of pins per interface without losing functionality, (ii) combining the separate path overhead and transport overhead interfaces into a single interface, and/or (iii) using the single, combined interface to communicate between a path and transport overhead processor and an overhead generator and/or an overhead extractor.

BRIEF DESCRIPTION OF THE DRAWINGS

These and other objects, features and advantages of the present invention will be apparent from the following detailed description and the appended claims and drawings in which:

FIG. 1 is a block diagram of a conventional synchronizing circuit having separate path and transport overhead interfaces;

DETAILED DESCRIPTION OF THE PREFERRED EMBODIMENTS

The present invention concerns an architecture, circuit and method for synchronizing a path and/or transport overhead generator and/or extractor to an overhead processor. The present invention may provide a single interface for the path overhead and the transport overhead, and may reduce the overall number of pins when compared to the scheme shown in FIG. 1. The method may indicate a start of a SONET frame by providing a start-of-frame (SOF) pulse on a pin, thereby indicating that the next row is the start of the frame. Similarly, a pin pulse generally indicates to the overhead generator that the start of the data payload is in the next row. A similar scheme may be used for the receive interface. One aspect of the present invention provides in-band signaling to communicate between the processor and the generator or between the processor and the extractor, using a sequence of patterns on the pin to designate an out-of-synchronization condition. An alternative embodiment may provide intelligent generators or extractors to count pulses to thereby determine an out-of-synchronization condition.

Figure 2:
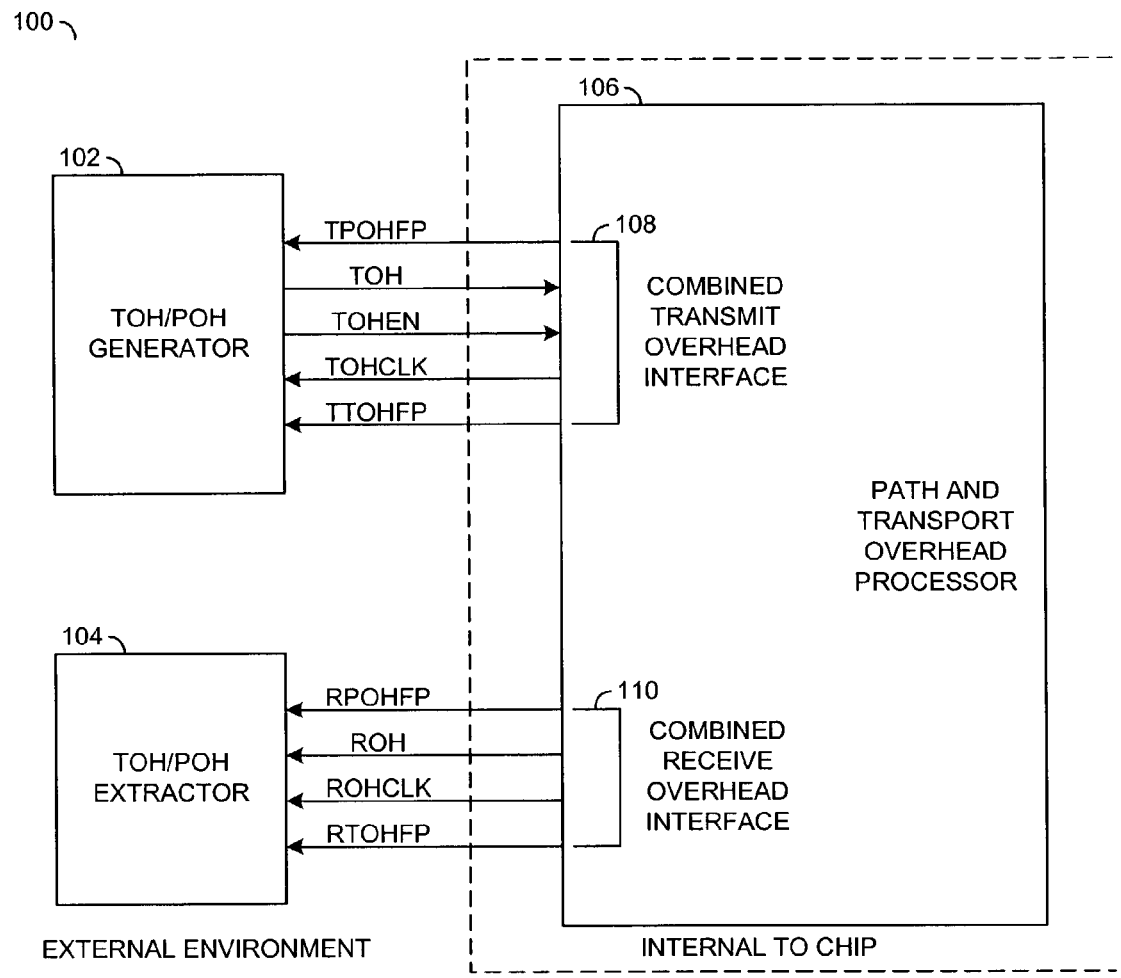
FIG. 2 is a block diagram of combined path and overhead interfaces in accordance with a preferred embodiment of the present invention.

Referring to FIG. 2, a circuit 100 is shown in accordance with a preferred embodiment of the present invention. The circuit 100 generally comprises a generator (e.g., a transport overhead/path overhead generator) 102, an extractor (e.g., a transport overhead/path overhead extractor) 104, and a processor (e.g., a path and transport overhead processor) 106. The processor 106 may include an interface (e.g., a combined transmit overhead interface) 108 and an interface (e.g., a combined receive overhead interface) 110. The interfaces 108 and 110 may combine the features of the path overhead interface and the transport overhead interface, and may be referred to as a combined transmit or combined receive overhead interfaces. By combining the functions of the two interfaces, up to three pins may be eliminated on the transmit side (e.g., the pins TPOH, TPOHCLK, TPOHEN of FIG. 1), and up to two pins may be eliminated from the receive side (e.g., the pins RPOH and RPOHCLK of FIG. 1).

The transport overhead bytes may be synchronized with a pulse on the TTOHFP pin for the transmit interface 108. The pulse may operate in a manner similar to the approach of FIG. 1, and may indicate a start of the SONET frame. The pulse(s) on the TTOHFP pin may appear one row before the actual start of the frame, generally indicating to the overhead generator 102 that the next row of the SONET frame is the start of the frame. In this way, the transport overhead data may be obtained by the overhead processor 106 one row before the data is actually processed. A pulse on the TPOHFP pin may indicate the start of the payload. Similarly to the start of frame pulse, a start of payload pulse may indicate to the overhead generator 102 that a start of the next payload is in the next row, for which the data in the current row may be required. In this way, all the overhead bytes are obtained by the overhead processor 106 one row before they are used. Conventional logic in the overhead processor 106 may be configured to process and/or generate start of frame pulses and the corresponding payload.

For the receive interface 110, the overhead processor 106 may generate a pulse on the RTOHFP pin, generally indicating the start of the next SONET frame. The processor may also generate a pulse on the RPOHFP pin, generally indicating the start of the next payload. Conventional processor logic may also be configured to process and/or generate the pulses on the RTOHFP pin and the RPOHFP pin.

In a SONET device, the location of the transport overhead in the SONET frame is generally fixed with respect to the start of frame. However, the location of the start of payload in the frame may vary. The payload column may move in the frame in four different ways according to the following conditions: (1) new pointer with pointer movement negative, (2) negative frequency justification, (3) new pointer with pointer movement positive, and (4) positive frequency justification. Conditions (1) and (3) may be implemented with only one pointer in a row, since such conditions generally do not cause the overhead processor 106 and either the overhead generator 102 or the overhead extractor 104 to go out of synchronization.

In one case, negative frequency justification may occur when a path overhead (POH) byte is in the first column. Such a condition may move the POH byte into an H3 location in row 3. In turn, this may cause the next POH byte to move into the last column of the 3rd row. In such a case, there may be two POH bytes that need to be transmitted in the same row. During such a condition, the second POH byte received by the overhead processor 106 in the 3rd row may be for the second POH byte. From then on, each successive POH byte may be extracted by the overhead processor 106 in the same row in which the POH byte is received. This condition may be considered to be a state in which the overhead processor 106 and the overhead generator 102 are out of synchronization. If this condition is not corrected, and the overhead processor 106 may perform several subsequent negative frequency justifications, the POH overhead byte may be required to be sent before being completely received, which should result in a path overhead byte error.

A second problem may occur for the positive frequency justification. In this case, with relevance to the pins and/or signals in FIG. 1, there may be a condition where no POH byte is received or present in a given row (e.g., row 3). If, for example, the POH byte is in the last column of the 3rd row and positive frequency justification occurs, row 3 may not need to send a POH byte. Thus, the overhead generator 102 may have provided the POH byte two rows before being sent. If the overhead generator 102 and the overhead processor 106 are not synchronized (e.g., such that a difference of 2 rows exists from the time the POH byte is sent by the overhead generator 102 to the time the POH byte is ready to be extracted by the overhead processor 106 for subsequent transmission), a buffer overflow condition may occur in the overhead processor 106. A resulting error may occur in the POH byte after several subsequent positive justifications.

For the receive interface 110, failure to correct negative frequency justification may cause buffer overflow, and failure to correct positive frequency justification may cause incorrect interpretation of data.

The above mentioned problems suggest that there should be a mechanism to synchronize the overhead processor 106 with the overhead generator 102 and/or the overhead extractor 104. One embodiment of the present invention may provide an in-band signaling scheme to establish synchronization between the overhead processor 106 and the overhead generator 102 and/or between the overhead processor 106 and the overhead extractor 104. A conventional state machine, receiving information about the presence and/or frame location of POH byte (s), may generate the in-band signals. Such an embodiment may use the fact that a pulse on the path overhead frame pin XPOHFP (e.g., where X=T or X=R) indicates a start of the payload. A pattern or sequence of patterns on the XPOHFP pin may communicate an out-of-synchronization condition. Exemplary patterns are shown in the following Table 1:

TABLE 1

| PATTERN | CONDITION | GENERATOR ACTION | EXTRACTOR ACTION |
|---|---|---|---|
| 01000 | Synchronized | Send J1 Byte only | Expect J1 Byte only |
| 01100 | Negative Frequency Justification | Send Z5 and J1 Bytes | Expect Z5 and J1 Bytes |
| 01110 | Positive Frequency Justification | Send J1 Byte in the next Row | Expect J1 Byte in the next Row |

Such an embodiment may bring the overhead processor 106 and the overhead generator 102, or the overhead processor 106 and the overhead extractor 104 into synchronization within one frame time period.

Figure 3A:
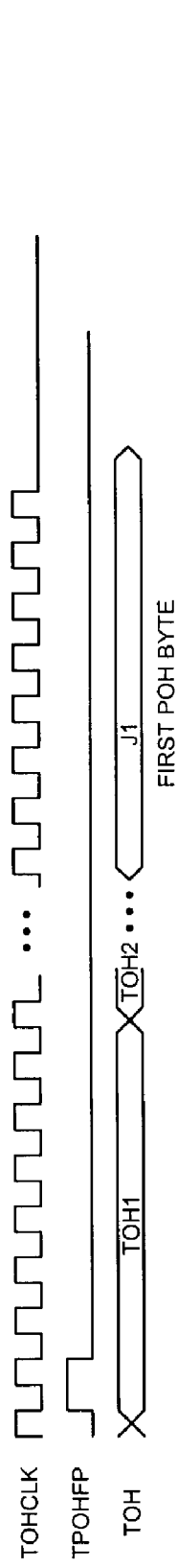
FIGS. 3a-3c are timing diagrams illustrating an exemplary communication protocol for synchronization between the processor and the generator or the processor and the extractor within one time frame.
Figure 3B:
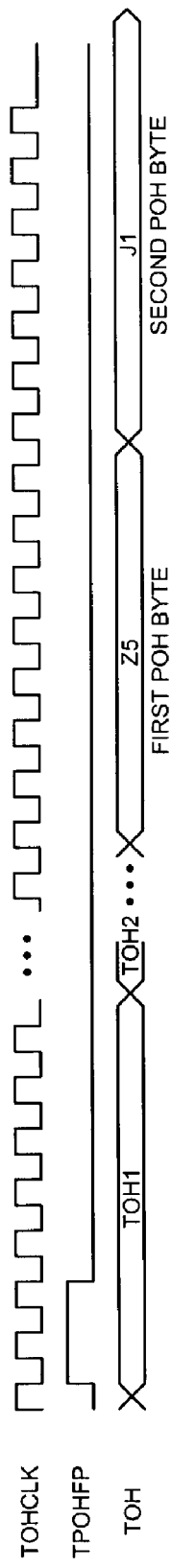
Figure 3C:
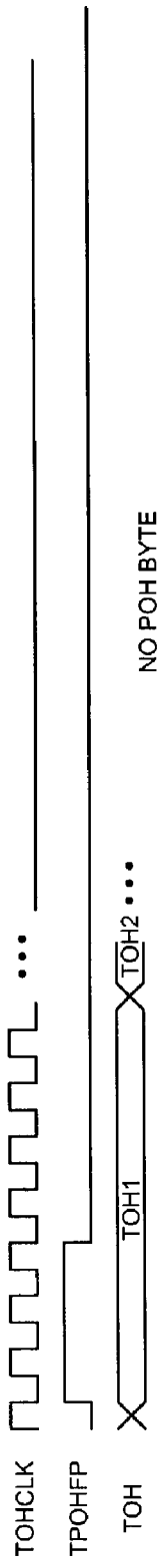

FIGS. 3a-3c illustrate exemplary waveforms generated in one example of the communication described in connection with FIG. 2. FIG. 3a shows the synchronization pattern for the transmit side in which a start of payload signal that is active for n cycles indicates that the transport overhead bytes (e.g., TOH) may be shifted out first and the J1 path overhead byte is shifted out at the end of the row. FIG. 3b illustrates the condition for negative frequency justification where a start of payload signal that is active for M cycles (e.g., where M is an integer) indicates that the TOH bytes may be shifted out first, then the Z5 and the J1 bytes may be shifted out at the end. FIG. 3c illustrates the condition for positive frequency justification where no path overhead byte is present. In this condition, the path overhead byte(s) is/are shifted from the end of the row to the beginning of the next row.

Figure 4A:
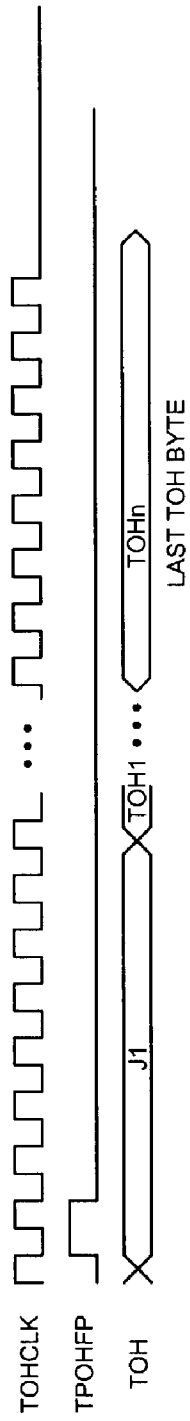
FIGS. 4a-4c are timing diagrams illustrating another exemplary communication protocol for synchronization between the processor and the generator or the processor and the extractor within one time frame when the generator first sends a path overhead byte.
Figure 4B:
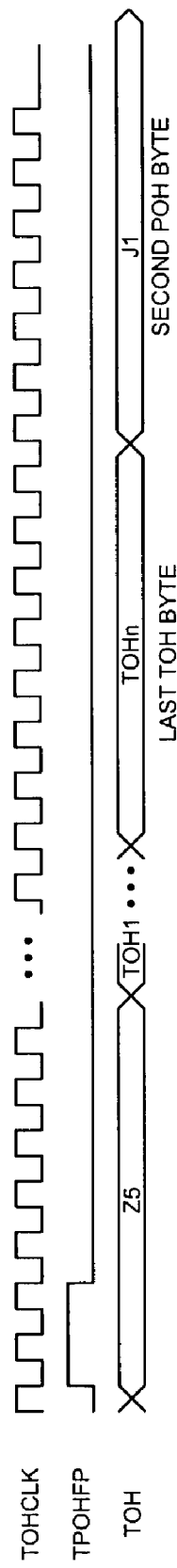
Figure 4C:
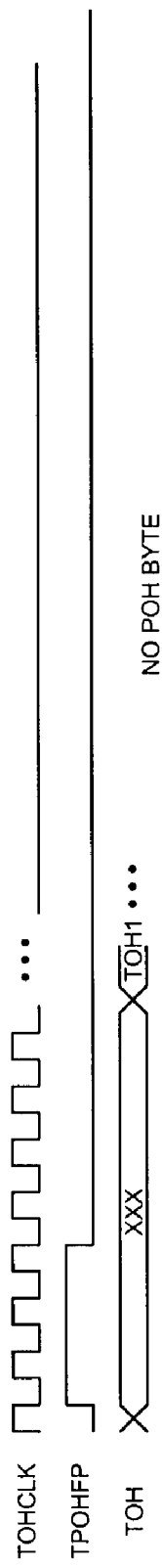

FIGS. 4a, 4b and 4c illustrate exemplary waveforms for the condition where the overhead generator 102 may send the path overhead byte first. In the case of positive frequency justification, the path overhead byte sent in the same row as the TPOHFP pulse may be ignored by the overhead processor 106, which is generally expecting the J1 byte in the next row. FIG. 4a shows the transmit overhead where the overhead byte is sent first. FIG. 4b shows the synchronization pattern after negative frequency justification, where the J1 byte has been shifted from the first byte of row N+1 to the last byte of row N. FIG. 4c shows the synchronization pattern after multiple successive positive justification. A detailed description of SONET frames may be found in "Practical Data Communications" by Roger L. Freeman (e.g., p 443-448) which is hereby incorporated by reference in its entirety.

In another embodiment of the present invention, implementation of the communication between the overhead processor 106 and the overhead generator 102 or between the overhead processor 106 and the overhead extractor 104 may be implemented without in-band signaling. In such an embodiment, the overhead generator 102 and the overhead extractor 104 may need to be implemented with some built-in intelligence and/or logic. Such intelligent generators 102 or extractors 104 generally count between POHFP pulses to determine whether the pulses have occurred before or after an expected time. If a pulse has occurred earlier by one or more clock cycle(s), a negative frequency justification condition generally occurs. In this condition, the Z5 and/or J1 path overhead bytes may be sent in a first row. If the pulse occurs later by one or more clock cycle (s), a positive frequency justification condition generally occurs, in which case, the overhead processor 106 will send the J1 byte in the next row.

If the XPOHFP pulse comes earlier or later than expected by more than one byte, then pointer movement has occurred. The above process (e.g., sending the J1 byte) may be repeated until proper synchronization has occurred.

While the invention has been particularly shown and described with reference to the preferred embodiments thereof, it will be understood by those skilled in the art that various changes in form and details may be made without departing from the spirit and scope of the invention.

The invention claimed is:

1. A method for synchronizing an overhead generator or an overhead extractor to an overhead processor having a combined path and transport overhead interface, comprising the steps of:
   (A) synchronizing overhead data with a pulse generated in a first row; and
   (B) presenting the overhead data in the first row, wherein the overhead data is processed in a subsequent row.

2. The method according to claim 1, wherein:
   the pulse comprises a start of frame pulse; and
   the overhead data comprises at least one transport overhead byte.

3. The method according to claim 1, wherein:
   the pulse comprises a start of payload pulse; and
   the overhead data comprises at least one path overhead byte.

4. The method according to claim 1 further comprising the steps of:
   communicating a start of frame pulse via a first pin;
   communicating a start of payload pulse via a second pin; and
   multiplexing transport overhead data and path overhead data on a third pin.

5. The method of claim 1, further comprising the step of:
   communicating at least one out-of-synchronization condition with the pulse by in-band signaling.

6. The method according to claim 5, wherein the in-band signaling comprises embedding one or more patterns in the pulse.

7. The method of claim 1, further comprising the steps of:
   determining when the pulse occurs relative to an expected time; and
   synchronizing the overhead data based on the result of the determining step.

8. A circuit having a combined path overhead and transport overhead interface comprising:
   means for synchronizing overhead data with a pulse generated in a first row; and
   means for presenting the overhead data in the first row, wherein the overhead data is processed in a subsequent row.

9. An apparatus comprising:
   a first pin at which a pulse is presented;
   a second pin at which overhead data is presented; and
   an interface circuit combining path overhead interface features and transport overhead interface features into a single interface, wherein said interface circuit is configured to synchronize the overhead data with the pulse, wherein the pulse is generated in a first row and the overhead data is presented in the first row and processed in a subsequent row.

10. The apparatus according to claim 9, wherein:
    the pulse comprises a start of frame pulse; and
    the overhead data comprises at least one transport overhead byte.

11. The apparatus according to claim 9, wherein:

the pulse comprises a start of payload pulse; and the overhead data comprises at least one path overhead byte.

12. The apparatus according to claim 9, further comprising a third pin, wherein:

a start of frame pulse is presented at the first pin;

a start of payload pulse is presented at the third pin; and said interface circuit is configured to multiplex transport overhead data and path overhead data on the second pin.

13. The apparatus according to claim 12, wherein:

the interface circuit is further configured to communicate at least one out-of-synchronization condition via the start of payload pulse by in-band signaling.

14. The apparatus according to claim 12, wherein:

the interface circuit is further configured to communicate at least one out-of-synchronization condition by embedding one or more patterns in the start of payload pulse.

15. The apparatus according to claim 12, wherein:

the interface circuit is further configured (i) to compare when the start of payload pulse occurs to an expected time and (ii) to synchronize the path overhead data based on a result of the comparison.

16. The apparatus according to claim 12, further comprising:

a fourth pin at which a clock signal is presented, wherein the interface circuit is further configured to shift the overhead data in response to the clock signal.

17. The apparatus according to claim 12, wherein the apparatus comprises one or more of an overhead processor, an overhead generator and an overhead extractor.

18. The apparatus according to claim 12, wherein the apparatus comprises:

a first interface circuit configured to de-multiplex transport and path overhead data received from an overhead generator; and a second interface circuit configured to multiplex transport and path overhead data presented to an overhead extractor.

19. The apparatus according to claim 15, wherein said interface circuit is configured to count a number of clock cycles occurring between start of payload pulses.

20. The apparatus according to claim 19, wherein said interface circuit is configured to generate:

in-band signaling to indicate a negative frequency justification condition when the start of payload pulse occurs earlier than expected; and in-band signaling to indicate a positive frequency justification condition when the start of payload pulse occurs later than expected.

* * * * *